US006686738B2

(12) United States Patent
Edwards

(10) Patent No.: US 6,686,738 B2
(45) Date of Patent: *Feb. 3, 2004

(54) METHOD FOR DETERMINING DECAY CHARACTERISTICS OF MULTI-COMPONENT DOWNHOLE DECAY DATA

(75) Inventor: Carl M. Edwards, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/066,976

(22) Filed: Feb. 4, 2002

(65) Prior Publication Data

US 2003/0006769 A1 Jan. 9, 2003

Related U.S. Application Data

(60) Provisional application No. 60/284,336, filed on Apr. 17, 2001.

(51) Int. Cl.[7] .................................................. G01V 3/00
(52) U.S. Cl. ........................................................ 324/303
(58) Field of Search ........................................... 324/303

(56) References Cited

U.S. PATENT DOCUMENTS

| | | | | |
|---|---|---|---|---|
| 4,151,413 A | * | 4/1979 | Arnold | 250/269.8 |
| 4,350,887 A | * | 9/1982 | Barnard et al. | 250/265 |
| 4,409,481 A | | 10/1983 | Smith, Jr. et al. | 250/270 |
| 4,710,713 A | | 12/1987 | Strikman | 324/303 |
| 4,717,877 A | | 1/1988 | Taicher et al. | 324/303 |
| 4,814,610 A | * | 3/1989 | Attali et al. | 250/269.2 |
| 4,933,638 A | * | 6/1990 | Kleinberg et al. | 324/303 |
| 5,023,551 A | * | 6/1991 | Kleinberg et al. | 324/303 |
| 5,289,124 A | * | 2/1994 | Jerosch-Herold et al. | 324/303 |
| 5,291,137 A | | 3/1994 | Freedman | 324/303 |
| 5,381,092 A | * | 1/1995 | Freedman | 324/303 |
| 5,387,865 A | * | 2/1995 | Jerosch-Herold et al. | 324/303 |
| 5,486,762 A | * | 1/1996 | Freedman et al. | 324/303 |
| 5,498,960 A | * | 3/1996 | Vinegar et al. | 324/303 |
| 5,517,115 A | | 5/1996 | Prammer | 324/303 |
| 5,764,058 A | | 6/1998 | Itskovich et al. | 324/303 |
| 5,973,321 A | | 10/1999 | Schmidt | 250/269.6 |
| 6,069,477 A | * | 5/2000 | Chen et al. | 324/303 |
| 6,229,308 B1 | * | 5/2001 | Freedman | 324/303 |
| 6,366,088 B1 | * | 4/2002 | Hagiwara | 324/303 |
| 6,512,371 B2 | * | 1/2003 | Prammer | 324/303 |

OTHER PUBLICATIONS

RM West and RA Williams; "Opportunities for Data Fusion in Multi–Modality Tomography", 1st World Congress on Industrial Process Tomography, 14–17 1999, pp. 195–200.*
Dean Karlen, "Multicomponent Spin–Spin Relaxation (T2) Data Analysis by Least Squares Methods", www.physics,carleton.ca, pp. 1–28.*

* cited by examiner

Primary Examiner—Diego Gutierrez
Assistant Examiner—Dixomara Vargas
(74) Attorney, Agent, or Firm—Madan, Mossman & Sriram, P.C.

(57) ABSTRACT

Measurements from many logging instruments such as Gamma ray counts from a pulsed neutron instrument, and amplitudes of spin-echo signals from a NMR instrument, typically have a spectrum that contains a plurality of exponentially decaying components. The slowest decaying component is obtained by fitting a single exponential over the tail end of the data and selecting a beginning for the fitting window that minimizes the product of the chi-square and the standard error of the fit. The single determined component may be subtracted from the data and the process repeated to give additional components. The determined components are indicative of thermal neutron capture cross-sections (in the case of a pulsed neutron instrument) and of the distribution of relaxation times and fluids within the pores of a rock in the case of a NMR instrument.

5 Claims, 4 Drawing Sheets

METHOD FOR DETERMINING DECAY CHARACTERISTICS OF MULTI-COMPONENT DOWNHOLE DECAY DATA

CROSS REFERENCES TO RELATED APPLICATIONS

This application claims priority from U.S. Provisional Patent Application Ser. No. 60/284,336 filed on Apr. 17, 2001. This application is also related to U.S. patent application Ser. No. 10/066,839, filed concurrently with the present application having the same title as the present application and having as inventor Medhat Mickael.

BACKGROUND OF THE INVENTION

1. Field of the Invention

The invention is related to the field of interpretation of data from well logging instruments comprising a plurality of exponentials. More specifically, the invention is related to methods of processing measurements from a nuclear magnetic resonance logging instrument. By way of example, the method of the present invention is described in relation to the processing of measurements made by a pulsed neutron well logging instrument for determining various properties of earth formations penetrated by a wellbore. The processing method enables separating various components of the signals from the instruments to obtain parameters of interest.

2. Background of the Art

Pulsed neutron well logging instruments are known in the art for determining the macroscopic thermal neutron capture cross-section of earth formations penetrated by a wellbore. A typical pulsed neutron well logging instrument is described, for example, in a sales brochure entitled PDK-100, Western Atlas Logging Services, Houston, Tex. (1994). Typical pulsed neutron instruments include a controllable source of high-energy neutrons and one or more gamma ray radiation detectors positioned at spaced apart locations from the neutron source. The source is periodically activated to emit controlled-duration "bursts" of high-energy neutrons into the earth formations surrounding the borohole. The neutrons interact with atomic nuclei of the materials in the earth formations, losing energy with each interaction until the neutrons reach the thermal energy level (defined as having a most likely energy of about 0.025 electron volts). Depending on the material composition of the earth formations proximal to the instrument, the thermal neutrons can be absorbed, or "captured", at various rates by certain types of atomic nuclei in the earth formations. When one of these atomic nuclei captures a thermal neutron it emits a gamma ray, referred to as a "capture gamma ray".

The rate at which the capture gamma rays are emitted, with respect to the elapsed time after the end of the neutron "burst" depends on, among other things, the relative concentration per unit volume in the earth formations of atomic nuclei which have a relatively large tendency to absorb thermal neutrons and emit capture gamma rays in response. This tendency is referred to as the thermal neutron capture "cross-section". A common chemical element found in earth formations having high capture cross-section atomic nuclei is chlorine. Chlorine in earth formations is usually present in the form of chloride ion in solution in connate water present in the pore spaces of some of the earth formations. Chlorine has a very high thermal neutron capture cross-section. Thus a measurement of the thermal neutron decay time (or neutron lifetime) of the earth formations in the vicinity of the wellbore can be indicative of amount of saline fluid present in the pore spaces of the earth formation. When combined with values of connate water salinity, fractional volume of pores space ("porosity"), and measurements of the fractional content of fine grained particles in the formation ("formation shaliness") it is possible to determine the fractional fluid saturation of useful materials, such as oil or gas, present in the pore spaces of the earth formation.

It has proven difficult to determine the fractional saturation of oil or gas under certain wellbore conditions by processing the capture gamma ray measurements according to methods known in the art for determining the thermal neutron capture cross-section, $\Sigma_f$, of the earth formation of interest. Several factors contribute to the difficulty of determining $\Sigma_f$ using the methods known in the art. First, the well logging instrument is typically inserted into a wellbore which is filled with liquid. At the time the pulsed neutron instrument is typically used, the wellbore generally has inserted therein a steel liner or casing. The liner or casing is generally held in place by cement filling an annular space between the wellbore wall and the exterior of the liner or casing. As high energy neutrons leave the neutron source in the logging instrument, the liquid in the wellbore has the effect of rapidly moderating (or slowing down) the high energy neutrons to the thermal level because of the high concentration of hydrogen nuclei in the liquid.

In general, the relative numbers ("population") at any particular time after a neutron burst, of thermal neutrons in the wellbore and in the earth formations proximal to the wellbore will depend on the porosity and on the hydrogen nucleus concentration per unit volume within the earth formation. The thermal neutrons present in the wellbore and in the earth formations can be "captured" or absorbed by nuclei of various chemical elements in the wellbore and formations, at a rate which depends upon the relative concentration and on the thermal neutron capture cross-section of these elements. In wellbores and in earth formations some of the more common elements having high thermal neutron cross-sections include chlorine, hydrogen, iron, silicon, calcium, boron, and sulfur. The thermal neutron decay time or "neutron lifetime", as determined from measurements of capture gamma rays made by the well logging instrument, represents combined effects of the thermal neutron capture cross-section in each of several "regions" (volumes of space surrounding the logging instrument) within the wellbore as well as from the earth formations proximal to the wellbore. These regions generally include the instrument itself, the fluid in the wellbore, the steel casing, the cement, the earth formation radially proximal to the wellbore wall (which may have been infiltrated by fluid from within the wellbore), and the earth formations radially more distal from the wellbore wall (which have minimal infiltration from the fluid in the wellbore).

Determining $\Sigma_f$ using data processing methods known in the art can be further complicated if the earth formation does not have a truly homogenous material composition on the scale of measurements made by the well logging instrument. Conditions in the earth formations subject to this difficulty can include earth formations consisting of a layered "sand/shale" sequence wherein the layers are on the order of 3–4 inches thick, or can include the presence of a fluid transition zone such as a gas/oil or an oil/water contact in the earth formation. Other conditions can include the presence of a radial zone located within approximately 2–8 inches from the wellbore wall having a different fluid than in a radially more distal zone, this being familiar to those skilled in the art as being caused by such processes as "invasion" (the previously described fluid infiltration), and gas or water "coning" as well as other processes known in the art.

The capture gamma ray detection rate as measured by the logging instrument will necessarily include fractional contributions from all of the regions in the vicinity of the logging instrument. Each of these regions has an indeterminate fractional contribution to the overall capture gamma ray counting rate as measured by the logging instrument, and can also have an unknown value of capture cross-section Several processing methods are known in the art for determining the macroscopic thermal neutron capture cross-section of the formation, $\Sigma_f$, from the measured capture gamma ray counting rates with respect to time after the end of each neutron burst (referred to as the counting rate "time spectrum" or "decay spectrum"). Prior art processing methods included the assumption that the thermal neutron capture cross-section of the regions within the wellbore are significantly higher than the capture cross-section of the surrounding earth formations. Limitations to these methods are described, for example, in U.S. Pat. No. 4,409,481 issued to Smith et al.

The processing method described in the Smith et al patent includes the assumption that the decay of the gamma ray counting rate with respect to time includes the effects of two and only two distinct exponential decay rates, the first caused by the materials within the wellbore and the second caused by the materials in the earth formations proximal to the wellbore. The method described in the Smith et al patent includes the assumption that the length scales of the materials in the wellbore and in the earth formation are such that the effects of neutron diffusion averages out the actual variations in capture cross-section between the various regions and therefore can be represented by some average value of thermal neutron capture cross-section. As discussed previously, several common conditions exist where this is clearly not the case. Using the processing method described in the Smith et al patent can lead to erroneous results under these conditions.

U.S. Pat. No. 5,973,321 to Schmidt describes a model based method for inversion of thermal neutron decay data. The method includes generating a data kernel which is made up of representors, or models, of potential decay components of the wellbore and of the earth formations in the vicinity of the wellbore. A thermal neutron decay spectrum is measured by a pulsed neutron instrument including a controllable source of high energy neutrons and one or more gamma ray detectors at spaced apart locations from the source. The decay spectrum measured by the instrument is inverted to determine model parameters by which the individual representors are scaled so that when combined, the scaled representors most closely match the measured decay spectrum. A potential disadvantage of model based inversion methods such as that taught by Schmidt is that the curve fitting may give different results depending upon the choice of the model used to generate the data kernel.

A similar problem is encountered in the analysis of nuclear magnetic resonance (NMR) measurements. NMR relaxation data is often multi-exponential. It consists of discrete pairs of amplitudes and times that can be the amplitudes transformed into a monotonic function of time with a zero baseline. A simple example is the inversion-recovery data for protons on a simple linear hydrocarbon chain. There are two decay rates (or times), one associated with the protons attached to $CH_2$ groups and the other associated with the $CH_3$ groups. The data comprises pairs of free-induction-decay (FID) amplitudes and the time between the inversion pulse and the readout pulse. The data are a monotonic increasing function of time that reach a constant value at times much longer than the largest relaxation time. By subtracting the data from this constant value, the data are transformed into a monotonic decreasing function of time.

During the early development of NMR, graphical curve stripping was used to analyze multi-exponential decay data. In this method, the data are plotted on semi-logarithmic paper, and the region in which the data decay wit only the slowest relaxation time is selected. A straight line is drawn through the data and the parameters associated with this line determine both the slowest relaxation time and its amplitude. The fitted line is subtracted from the remaining data. This strips away the slowest relaxing component and leaving the other components intact. This process is repeated until the relaxation times and amplitudes have been determined. Although tedious, this process produces satisfactory results for bi- and tri-exponential data.

With the advent of computers, non-linear fitting procedures were developed. These would solve bi- and tri-exponential data using non-negative non-linear methods. Stability of the solution is sometimes a problem when fitting both the relaxation times and the corresponding amplitudes.

In recent years, NMR relaxation data from fluid filled oil reservoir rock samples has generated much interest. Empirical relations have been established that correlate permeability with relaxation times and amplitudes. For a sample filled with a single fluid, the relaxation time distribution has features related to the pore size distribution. The relaxation time distribution can vary over several orders of magnitude from less than a millisecond to greater than one second. To obtain the distribution, one must determine the relaxation times and amplitudes for a great many exponentials. In fact, the relaxation time distribution can be considered continuous.

The solutions for this problem generally assume a series of fixed relaxation times. This linearizes the problem and the amplitudes can be fitted by a number of different methods. U.S. Pat. No. 5,517,115 to Prammer teaches the use of singular value decomposition. U.S. Pat. No. 5,291,137 to Freedman discloses the use of a maximum likelihood method. Both of these methods use exponentials as basis functions, but other basis function set can be used as well. Amplitudes whose relaxation times are close together are highly correlated, so the number of independent relaxation times is significantly smaller than the number of amplitudes used in the inversion process. The number of amplitudes usually employed varies, but typically is more than 10.

There is a need for a method of determination of the components of a relaxation time of NMR spectra that does not use any predetermined models. The present invention satisfies this need.

SUMMARY OF THE INVENTION

The present invention is a method for obtaining parameters of interest of subterranean earth formations using NMR measurements that comprise two or more exponentially decaying functions of time. A fit is made using a single exponential to the tail end of the data and the beginning of the fitting window is selected so that a product of the goodness of fit and the standard error of the fit attains a minimum. The process may be used for determination of NMR relaxation times. By subtracting the determined fit from the measurements, the process may be repeated to find additional components of the decay spectrum.

DETAILED DESCRIPTION OF THE INVENTION

A pulsed neutron well logging instrument which can provide thermal neutron capture gamma ray measurements suitable for use with the method of this invention is described in a sales brochure entitled, PDK-100, Western Atlas Logging Services, Houston, Tex. (1994). It is to be understood that the invention is not limited to processing measurements made by the instrument described in this reference, but can also be used with measurements made by other sensor arrangements such as a pulsed neutron measurement-while-drilling (MWD) instrument, or a pulsed neutron sensor permanently emplaced either within a wellbore or permanently emplaced within, above, or below a subterranean reservoir in earth formations but not located within a wellbore.

Figure 1:
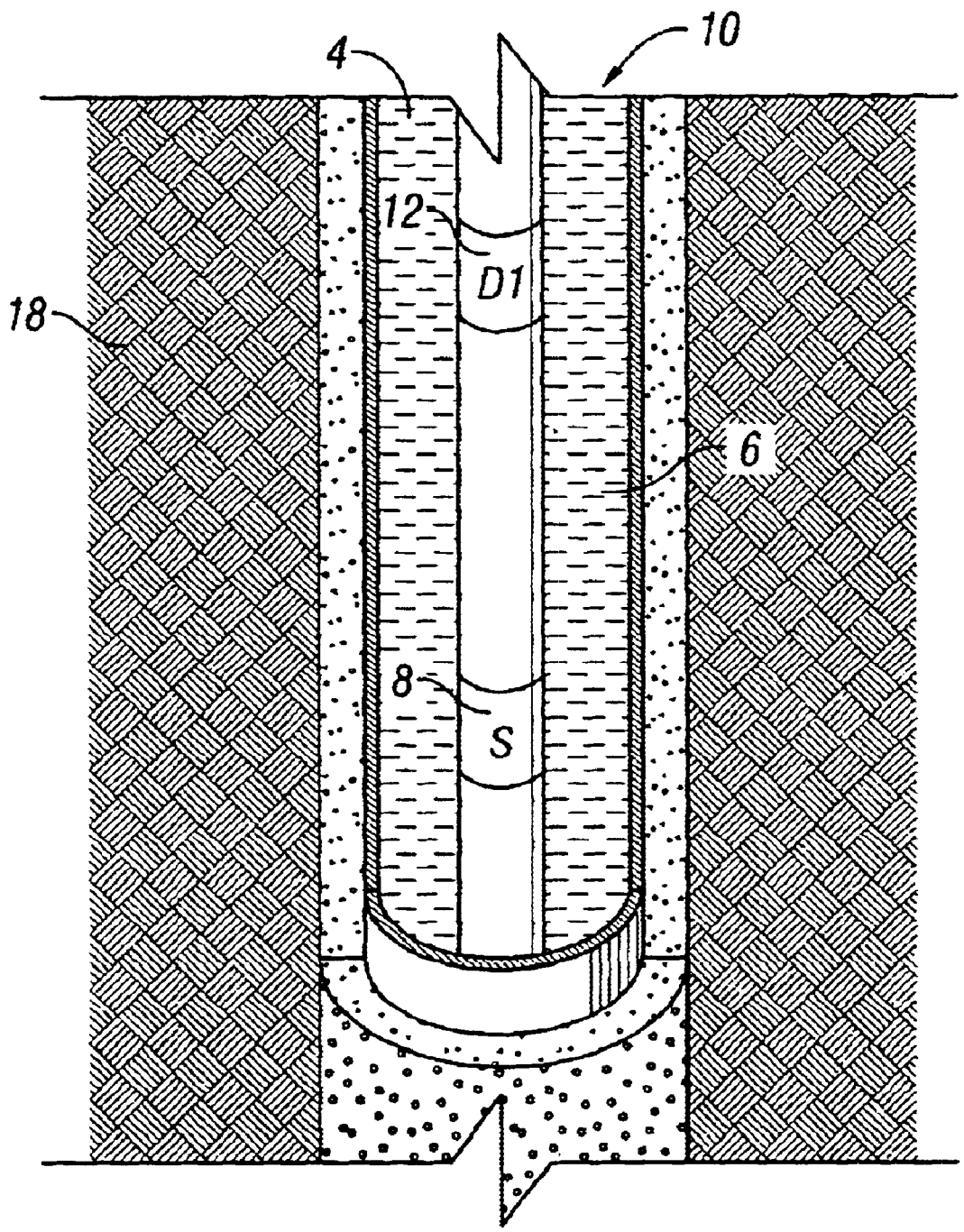
FIG. 1 (PRIOR ART) shows various regions within the wellbore and in the vicinity of the wellbore, including a pulsed neutron logging instrument positioned in the wellbore.

The well logging instrument described in the PDK-100 reference includes a controllable source of high-energy neutrons, and gamma ray detectors positioned at spaced apart locations from the neutron source.—Referring to FIG. 1, the well logging instrument 10 is typically inserted into a wellbore 4 penetrating earth formations 18. The wellbore 4 is generally filled with a liquid 6 of some type familiar to those skilled in the art. The instrument's 10 source 8 is periodically energized to produce short, controlled duration "bursts" of high-energy neutrons which interact with the earth formations 18 surrounding the instrument 10. Through interaction with the liquid 6 in the wellbore 4 and with the earth formations 18, the neutrons are reduced in energy to the thermal level, where they are susceptible to capture by atomic nuclei which have a high thermal neutron capture cross-section. Such a nucleus emits a "capture" gamma ray when it captures a thermal neutron, and the gamma ray may be detected by one of the detectors, one being shown at 12, on the well logging instrument 10. The manner of using the pulsed neutron logging instrument to obtain unprocessed capture gamma ray counting information about the earth formations is well known in the art.

The pulsed neutron well logging instrument 10 also typically includes circuits for counting the numbers of gamma rays detected by each one of the detectors 12. These circuits generally include the capability for determining some measurement of the time at which each gamma ray is detected with respect to the beginning (or end) of the neutron burst. The pulsed neutron well logging instrument can also include circuits for transmitting signals to the earth's surface which correspond, for each detector 12, to the numbers of gamma rays detected and the relative time of detection of the gamma rays. The well logging instrument 10 can alternatively, or in combination with the transmitting circuits, include other circuits used for storing signals corresponding to the gamma rays detected, for subsequent processing within the well logging instrument 10 itself. It should clearly be understood that the process of this invention may be performed within circuits located within the logging instrument itself, and that transmission of the gamma ray detection signals to the earth's surface for processing at the earth's surface is not meant to be a limitation on this invention.

A particularly useful feature of the well logging instrument described in the PDK-100 reference as it concerns this invention is that the gamma rays detected by the instrument are segregated into about 100 discrete, short-interval time windows, called "gates". Each gate corresponds to a different time interval after the end of the neutron burst. As will be further explained, determining the gamma ray counting rates in a relatively large number of short-duration gates after each neutron "burst" can substantially improve the ability to determine characteristics of the earth formations which are related to the capture gamma ray counting rates. It should be clearly understood that the number of gates into which the detected gamma rays are segregated is not a limitation on the invention. More or fewer gates may be used than as described in the PDK-100 reference, however using more, shorter duration gates may provide the advantage of being able to better resolve a plurality of individual, exponentially-decaying components in the materials surrounding the instrument. These components each can partially contribute to the overall gamma ray counting rate measured during the time span from the end of the neutron burst to the beginning of the subsequent neutron burst. For purposes of this invention, it is unnecessary for the gates to be absolutely contiguous in time and to have equal time duration. However, the statistical accuracy of the results calculated using the method of this invention can be improved if the amount of "dead time" between bursts for which no counts are measured is kept to a minimum.

Figure 2:
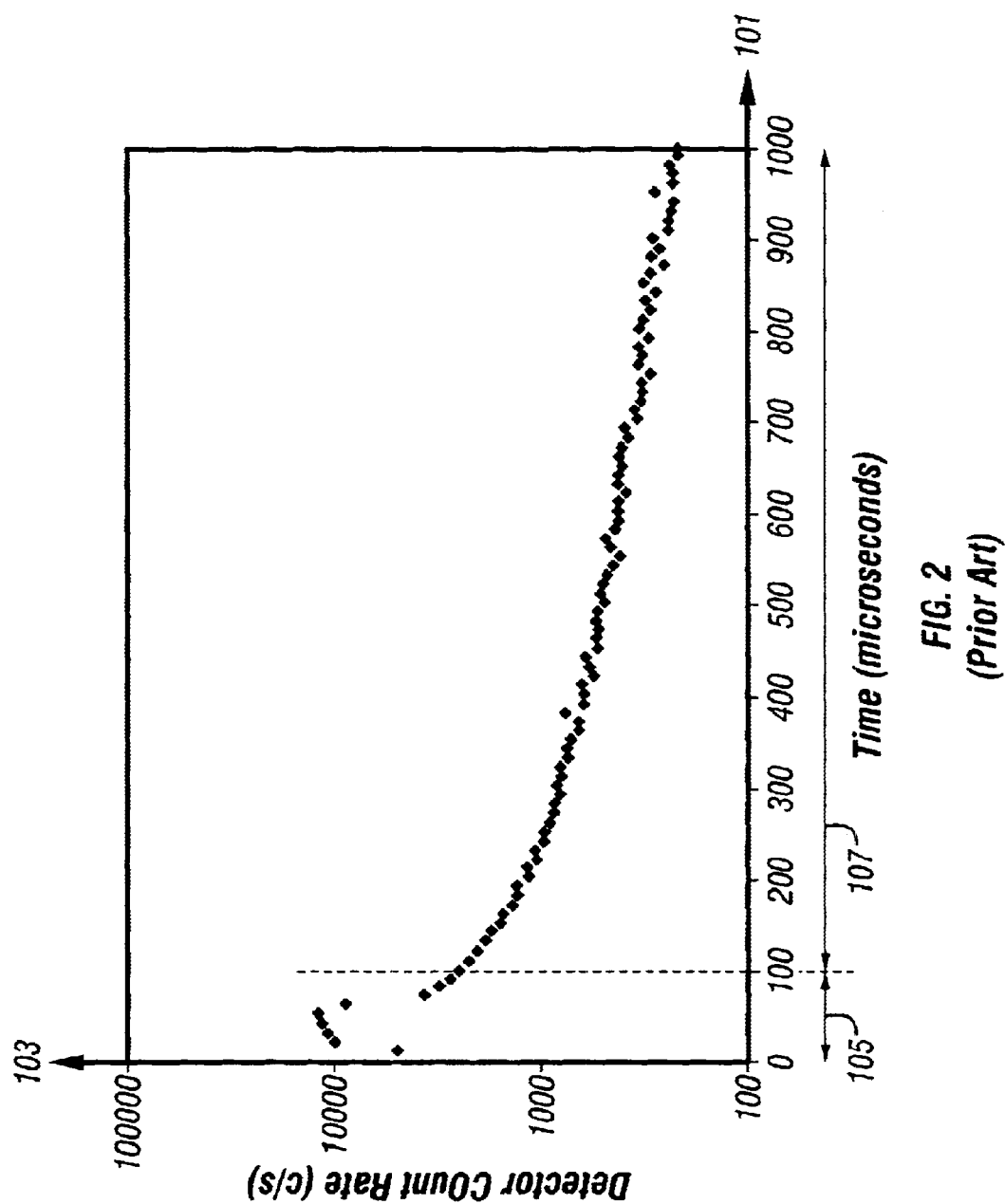
FIG. 2 (PRIOR ART) shows a typical time decay spectrum of neutron counts.

Turning now to FIG. 2, a typical time decay spectrum recorded in the detector is shown in FIG. 2. The abscissa 101 is time, with a total of 1000 $\mu$s of data being shown while the ordinate 103 is the detector count rate (the number of samples counted within a short duration gate. In a preferred embodiment of the invention, each of the short duration gates has a length of 10 $\mu$s. Note that the scale on the ordinate is a logarithmic scale.

The early portion (typically 100 $\mu$s) of the decay spectrum denoted by 105 $\mu$s dominated by the source burst and is not useful for the determination of formation or borehole parameters. The latter portion of the decay spectrum 107 extending from 100 $\mu$s to 1000 $\mu$s is representative of the neutron decay in the environment surrounding the tool.

In most commonly encountered situations, the capture cross section of the borehole fluid is typically higher than the capture cross section of the formation. The capture cross section of the borehole usually ranges from about 22 c.u. for fresh water or oil in the borehole to about 150 c.u. for fully saturated saltwater. On the other hand, the formation capture cross section ranges from about 5–7 c.u. for a zero p.u. to about 65 c.u. for a shale.

The decay spectrum contains many modes due to neutron decay in different regions. Separation of these decay modes is not easy due to the nonlinear nature of the governing equations. The solution of these nonlinear equations is slow, requires fairly good initial estimates, and is prone to failure in low contrast situations where different decay modes are similar.

Many attempts have been made in the past to determine the formation capture cross sections from the late portion of the spectrum assuming that after a certain time, there is no contribution from the borehole. The simplest approach is to determine the formation capture cross section from a single exponential fit in a fixed time gate within a time gate that starts between 400 and 600 $\mu$s and ends at 1000 $\mu$s. This approach suffers from three problems:

1. In low capture cross section boreholes where the borehole decay is relatively low, it may determine an erroneous formation capture cross section, 2. The statistical significance of the determined formation capture cross section in high capture cross section situations may be poor, and
3. The method may not be able to identify properly the borehole and the formation capture cross sections when the former is less than the latter.

The present invention determines the formation capture cross section from the late portion of the decay spectrum by determining the length of a variable length gate at the tail end of the spectrum that gives single exponent fit to the spectrum with high statistical significance. The detector response as a function of time after the burst can be approximated by $$y_i = \sum_j A_j e^{-\Sigma_j v t_i} \quad (1)$$

where $y_i$ is the detector count rate in the i-th window, and $\Sigma j$, $j=1, 2, \ldots n$ are the capture cross sections of n decay modes while $A_j$ is the weight associated with the j-th decay mode, $v$ is the thermal neutron speed and $t_1$ is the average time of the i-th channel.

To illustrate the method of the present invention, the method is discussed here for the case of n=2 components: those versed in the art would recognize how the method of the present invention could be used for more than two components.

For the case of two decay modes, the detector count from eq. (1) may be rewritten as $$y_i = A_1 e^{-\Sigma_1 v t_i} + A_2 e^{-\Sigma_2 v t_i} \quad (2)$$

Assuming that the first decay mode decays faster than the second mode ($\Sigma_1 >> \Sigma_2$) there is a time T after which eq. (2) may be written as $$y_i = A_2 e^{-\Sigma_2 v t_i} t_i > T \quad (3)$$

This may be rewritten as $$\log(y_i) = \log(A_2) - \Sigma_2 v t_i = A'_2 - \Sigma_2 v t_i \quad (4)$$

It is well known that a least squares solution of eq. (2) for times greater than T may be used to determine both $\Sigma_2$ and $A'_2$. In the present invention, such a least squares fit is performed for the latter part of the decay spectrum for various values of the starting time T. Next, the residual Chi-square ($\chi_T^2$) and the standard error of the fit ($\sigma_T^2$) are determined using the well-known equations $$\chi_T^2 = \frac{1}{N - I_T - 2} \sum_{i=I_T}^{N} [\log(y_i) - A_2 + \Sigma_2 v t_i] \quad (5)$$

and $$\sigma_T^2 = \frac{N - I_T}{\sum_{i=1}^{N} \sigma_i^2} \quad (6)$$

where N is the number of data points (from time the starting time T) in the fitting, $I_T$ is the window number corresponding to the starting time, and $\sigma_i$ is the fitting error for the i-th data point.

Figure 3:
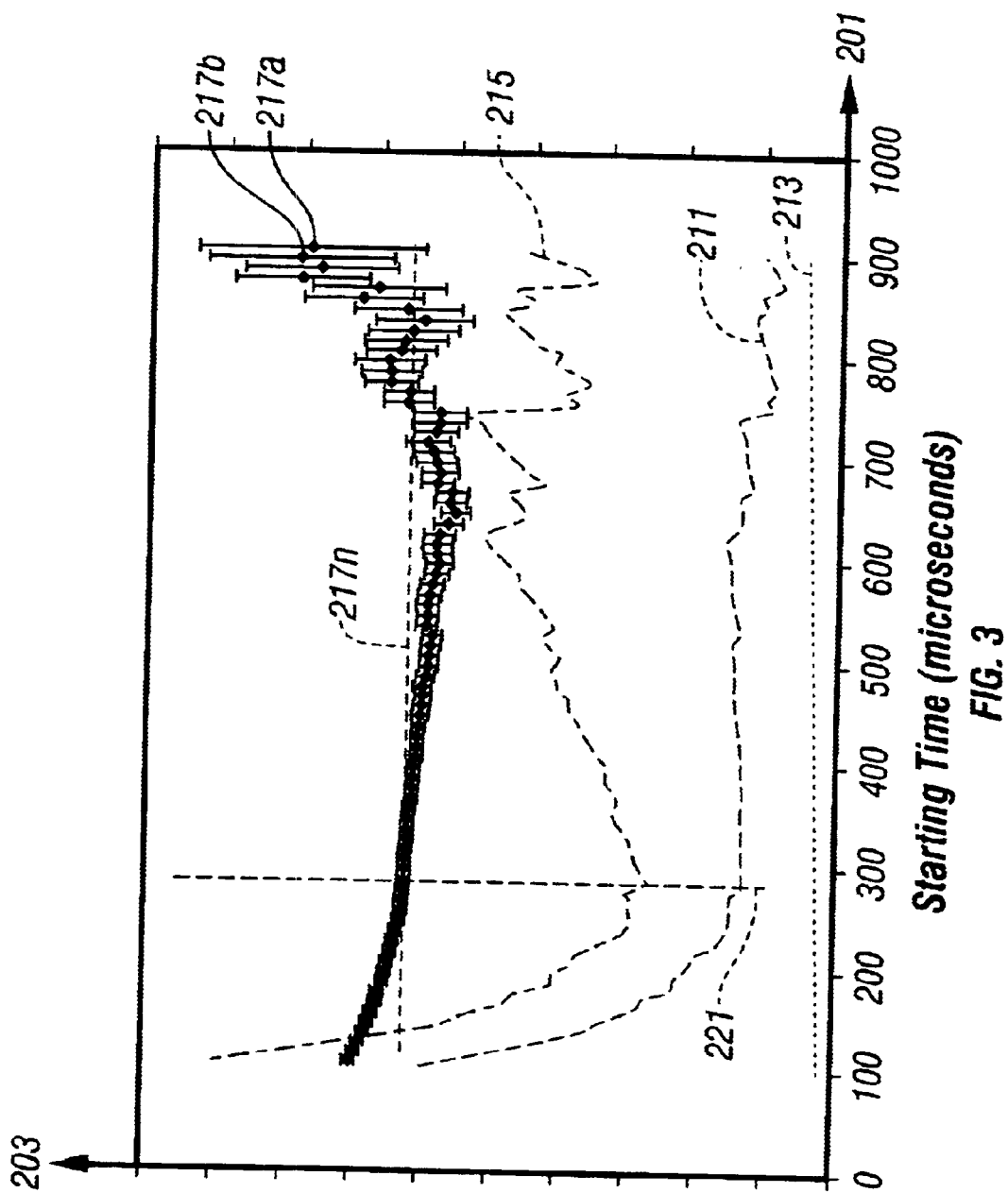
FIG. 3 shows analysis of data of a decay spectrum using the method of the present invention.

Turning now to FIG. 3, plots are shown of the Chi-square $\chi_T^2$ 211 and the standard deviation of the fit 213 (from eqs. 5 and 6) as a function of the starting time of the fitting procedure. The abscissa 201 is the starting time and the ordinate 203 the value of the function being plotted as described below. FIG. 3 shows that the $\chi_T^2$ decreases as a function of the starting time T and reaches a minimum when the starting time is substantially equal to the ending time of the spectrum (1000 $\mu s$). This is due to the fact that as the starting time gets closer to the burst at small values of the starting time T, the function describing the decay is no longer a single exponential but rather a multi-component exponential.

On the other hand, FIG. 3 shows that the $\sigma_T^2$ given by 213 increases with the starting time T. This is due to the fact that the early time data has higher signal-to-noise ratio than the data at later time; by definition, $\sigma_T^2$ measures only the variance of the data and is insensitive to the fitting function.

Also shown in FIG. 3 is the product of $\chi_T^2$ and $\sigma_T^2$ given by 215 and the calculated capture cross section $\Sigma$, shown along with its estimated standard deviation, by the points 217a, 217b, . . . 217n. In the preferred embodiment of the present invention, the starting time T denoted by 221 corresponds to a value where $\Sigma$ exhibits a plateau. It can be seen from FIG. 3 that the product of $\chi_T^2$ and $\sigma_T^2$ exhibits a minimum at the same time where $\Sigma$ deviates from a plateau. This means that an updated starting time at which the product of $\chi_T^2$ and $\sigma_T^2$ exhibits a minimum may be used to determine a starting time at which the decay can be described by a single exponential. Moreover, the $\Sigma$ calculated from a single exponential fit from this time forward should be the most accurate and statistically precise.

The extension of the method of the present invention to multiple exponentials is straightforward:, once the tail end of the decay spectrum has been described by a single exponential and a first starting time T determined, a new spectrum is obtained by subtracting the late exponential from the spectrum and repeating the procedure for additional exponents.

To test the validity of the method of the present invention, i.e., using a starting time for fitting based upon the product of the residual Chi-square the standard error of the fit, a large set of simulated data were generated to obtain the response of detectors under a variety of formation and borehole conditions. These are summarized in Table I.

TABLE I

| FORMATION AND BOREHOLE PARAMETERS OF THE MODEL | |
| --- | --- |
| Parameter | Range |
| Formation Porosity | 0, 10, 20, 30 and 40 p.u. |
| Formation water salinity | 0, 50, 100, 200 and 300 kppm. |
| Formation lithology | Sandstone |
| Borehole size | 6", 8.5" and 12.25" (open hole and cased hole) |
| Borehole salinity | 0, 5, 100, 200 and 300 kppm |

Figure 4:
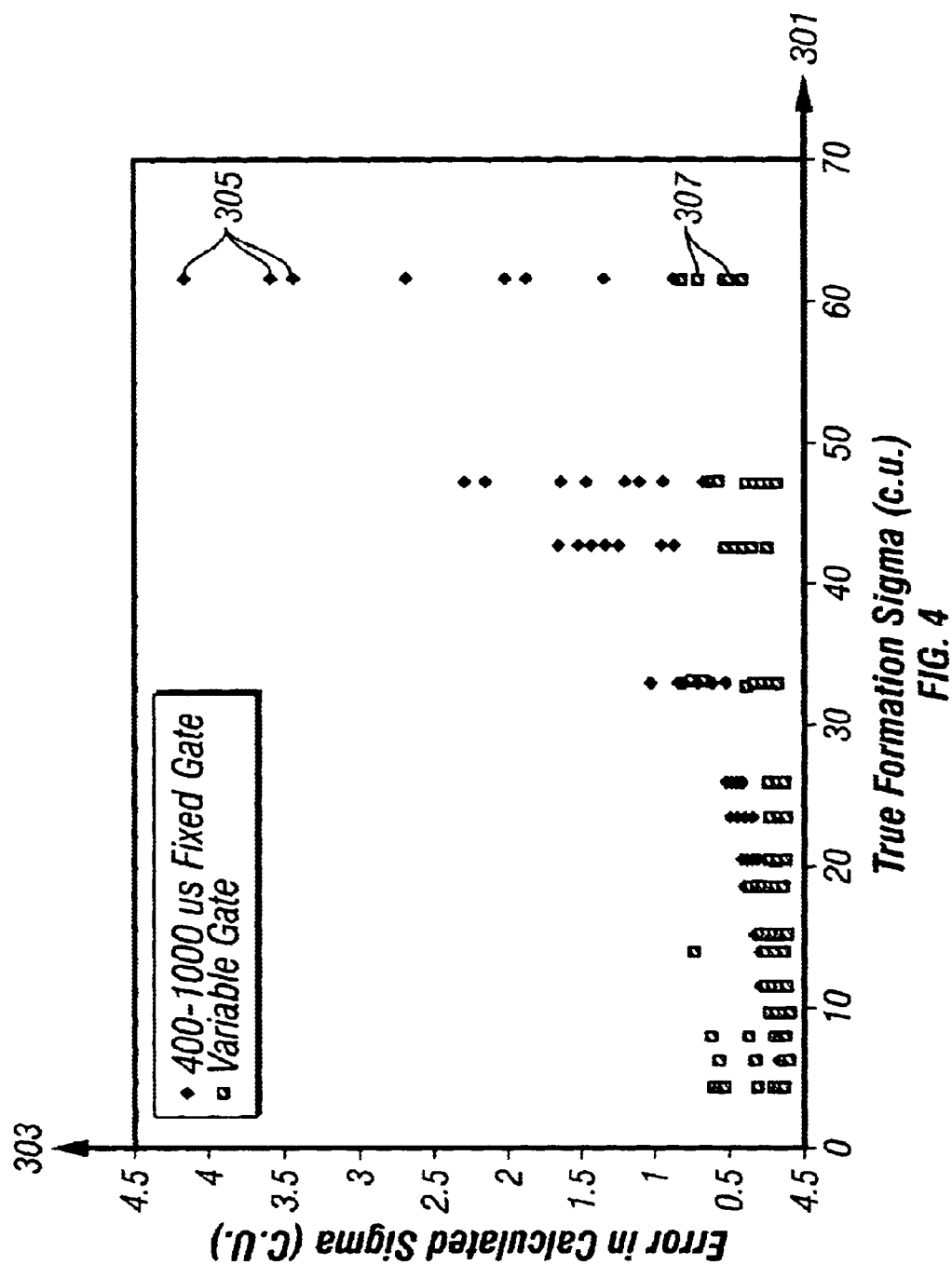
FIG. 4 shows a comparison of the result of using the method of the present invention with a prior art method on simulated decay data.

FIG. 4 shows a plot of the error in determination of the formation capture cross section (ordinate 303) as a function of the formation capture cross section (abscissa 301) for data obtained by simulation corresponding to Table I. The squares 307 correspond to determinations made using the method of the present invention while the diamonds 305 correspond to determinations made using a fixed gate starting at 400 ms. The present invention clearly gives more accurate determination of the cross section, particularly at high values of the formation cross section. The precision of the present method is slightly worse at low formation capture cross sections due to the fact that at these values of $\Sigma$, the prior art method starts too early and is contaminated with borehole decay, which produces an erroneous formation $\Sigma$.

In another aspect of the invention, the above process is implemented with no significant increase in computation time over a single least-squares minimization. Those versed in the art would recognize that the least squares procedure requires the summing of the variables $y_i$, $t_i$, and $t_i^2$ from eq. (4) over all time windows from $I_T$ to N. These values are stored in the computer memory. With values stored for these variables for each value of i, once the summation has been performed for any value of I, the summation for the next value of I only requires additions from the values stored in memory and no additional multiplications are required. The additions add relatively little to the computation time.

As noted above, the method of the present invention is also applicable to the analysis of NMR data. Nuclear magnetic resonance (NMR) well logging instruments can be used for determining, among other things, the fractional volume of pore space, the fractional volume of mobile fluid filling the pore space of earth formations, and the distribution of pore space sizes on the earth formations. NMR well logging apparatus are described, for example, in U.S. Pat. Nos. 4,710,713 and 4,717,876. NMR instruments known in the art are typically designed to make measurements corresponding to an amount of time for hydrogen nuclei present in the earth formation to realign their spin axes, and consequently their bulk magnetization, either with an externally applied magnetic field, or perpendicularly to the magnetic field, after momentary reorientation of the nuclear spin axes. A magnet disposed in the NMR instrument typically provides the externally applied magnetic field. The spin axes of the hydrogen nuclei in the earth formation are, in the aggregate, caused to be aligned with the magnetic field induced in the earth formation by the magnet. The NMR instrument includes an antenna positioned near the magnet and shaped so that a pulse of radio frequency (RF) power conducted through the antenna induces a magnetic field in the earth formation orthogonal to the field induced by the magnet. The RF pulse has a duration predetermined so that the spin axes of the hydrogen nuclei generally align themselves perpendicular both to the orthogonal magnetic field induced by the RF pulse and to the externally applied magnetic field. After the pulse ends, the nuclear magnetic moment of the hydrogen nuclei gradually "relax" or return to their alignment with the externally applied magnetic field. The amount of time taken for this relaxation is related to properties of interest of the earth formation.

After the RF pulse ends, the antenna is typically electrically connected to a receiver, which detects and measures voltages induced in the antenna by precessional rotation of the spin axes of the hydrogen nuclei. While the hydrogen nuclei gradually realign their spin axes with the magnet's field, they do so at different rates because of inhomogeneities in the magnet's field and because of differences in the chemical and magnetic environment within the earth formation. Different rates of realignment of the spin axes of the hydrogen nuclei results in a rapid decrease in the voltage induced in the antenna. The rapid decrease in the induced voltage is referred to as the free induction decay (FID).

After a predetermined time period following the FID, another, longer RF pulse is applied to the antenna. The longer RF pulse has a duration predetermined to realign the spin axes of the hydrogen nuclei in the earth formation by an axial rotation of 180° from their immediately previous orientations. After the longer RF pulse (called a 180° pulse), hydrogen nuclear axes that were realigning with the externally applied field at a slower rate are then positioned so that they are "ahead" of the faster realigning spin axes. The 180° movement causes the faster realigning axes are reoriented to be "behind" the slower realigning axes. The faster realigning axes eventually "catch up" to, and come into approximate alignment with, the slower aligning axes after the 180° reorientation. As a large number of the spin axes become aligned with each other, the hydrogen nuclei again are able to induce measurable voltages in the antenna. The voltage induced as a result of realignment of the hydrogen nuclear axes with each other after a 180° pulse is referred to as a "spin echo". The spin echo induced voltage is smaller than the original FID voltage generated after cessation of the first RF pulse, because the aggregate nuclear axial alignment, and consequently the bulk magnetization, of the hydrogen nuclei at the time of the spin echo is at least partially realigned with the magnet's field and away from the sensitive axis of the antenna. The spin echo voltage itself rapidly decays by FID as the faster aligning nuclear axes "dephase" from the slower aligning nuclear axes.

After another period of time equal to two of the predetermined time periods between the initial 90° RF pulse and the first 180° pulse, another RF pulse, of the same duration as the pulse causing the 180° shift in spin axis orientation, can be applied to the antenna. This next 180° pulse again causes the slower realigning spin axes to be positioned ahead of the faster realigning axes, and eventually another spin echo will induce voltages in the antenna. The induced voltages of this next spin echo will typically be smaller in amplitude than the previous spin echo.

Successive 180° RF pulses are applied to the antenna to generate successive spin echoes, each one typically having a smaller amplitude than the previous spin echo. The rate at which the peak amplitude of the spin echoes decays is related to properties of interest of the earth formation, such as the fractional volume of pore space or the fractional volume of mobile fluid filling the pore space. The number of spin echoes needed to determine the rate of spin echo amplitude decay is related o the properties of the earth formation; in some cases as many as 1,000 spin echoes may be needed to determine the amplitude decay corresponding to the properties of the earth formation which are of interest.

U.S. Pat. No. 5,764,058 to Itskovich teaches a technique for determining the number of independent relaxation times contained in the data. A curve stripping method is used in which the largest subset of the data that can be characterized by a single exponential a single exponential is determined. A nonlinear least squares technique is used to determine this exponential and this exponential is stripped from the data. The process is repeated until the entire data set has been fitted and the parameters for the correct number of components have been extracted.

This invention employs curves stripping as well. The inventive step here is the selection of the criterion for determining the size of the data subset that is characterized the slowest relaxing component. Itskovich uses a matrix method while this invention uses the product of the goodness of fit and the standard error of the fit.

Application of the curve stripping method of the present invention to NMR data has the advantage that both the relaxation times and amplitudes are estimated from the data. Each relaxation time and amplitude pair is uncorrelated with the other pairs.

While the foregoing disclosure is directed to the preferred embodiments of the invention, various modifications will be apparent to those skilled in the art. Specifically, in the logging of subterranean formations, other types of measurements may also be made that comprise at least two exponential decay components. It is intended that all variations within the scope and spirit of the appended claims be embraced by the foregoing disclosure.

What is claimed is:

1. A method for determining a parameter of interest of a subterranean formation comprising:
   (a) conveying a nuclear magnetic resonance (NMR) logging tool into a borehole in said subterranean formation obtaining measurements related to the parameter of interest, said measurements comprising at least two exponentially decaying components corresponding to at least two relaxation times of the formation;
   (b) for a plurality of starting times for analysis of said measurements, determining parameters of a fit to said measurements over a plurality of time windows between said starting times and a selected ending time, said selected ending time being greater than each of said plurality of starting times;
   (c) determining a goodness of fit, a standard error of fit, and a product of said goodness of fit and said standard error of fit for said plurality of starting times; and
   (d) selecting a value of said plurality of starting times for which said product attains a minimum value.

2. The method of claim 1 wherein said at least two exponentially decaying components further comprises at least three exponentially decaying components, the method further comprising
   (i) subtracting from said measurements the fit to said measurements corresponding to said determined value of the starting time, and
   (ii) repeating steps (b)–(d) of claim 1.

3. The method of claim 1 wherein obtaining said parameters of said fit further comprises storing values of times of said measurements, said measurements and squares of said times in a computer memory.

4. The method of claim 1 wherein determining the goodness of fit comprises determining a chi-squared value for the fit.

5. The method of claim 1 further comprising selecting said ending time so that said measurements consist primarily of one exponentially decaying component at said ending time.

* * * * *